(12) United States Patent
Wiedmayer

(10) Patent No.: US 6,331,027 B1
(45) Date of Patent: Dec. 18, 2001

(54) REMOVABLE VEHICLE SEAT HEADREST STORAGE IN A TRIM PANEL SOCKET

(75) Inventor: Jason Wiedmayer, Manchester, MI (US)

(73) Assignee: Ford Global Tech., Inc, Dearborn, MI (US)

( * ) Notice: Subject to any disclaimer, the term of this patent is extended or adjusted under 35 U.S.C. 154(b) by 2 days.

(21) Appl. No.: 09/681,004

(22) Filed: Nov. 3, 2000

(51) Int. Cl.[7] .............................. B60J 11/00; B60N 2/48
(52) U.S. Cl. .................. 296/37.8; 296/37.13; 296/63; 224/544
(58) Field of Search ................ 296/37.8, 37.13, 296/65.16; 297/410; 224/539, 543, 544

(56) References Cited

U.S. PATENT DOCUMENTS

| 1,038,403 | | 9/1912 | Mankey | 297/398 |
|---|---|---|---|---|
| 3,544,162 | * | 12/1970 | Uchiyamada et al. | 297/410 |
| 3,563,602 | * | 2/1971 | Ohta et al. | 297/410 |
| 4,750,774 | * | 6/1988 | Pickering | 296/37.13 |
| 5,029,928 | | 7/1991 | Huber | 296/63 |
| 5,154,477 | * | 10/1992 | Lacy | 297/397 |
| 5,239,711 | | 8/1993 | Talfur | 4/523 |
| 5,501,384 | * | 3/1996 | Wisniewski | 224/539 |
| 5,795,023 | | 8/1998 | Kayumi | 297/331 |
| 5,868,471 | | 2/1999 | Graham et al. | 297/397 |
| 5,947,358 | * | 9/1999 | Wieczorek | 224/543 |
| 5,971,467 | | 10/1999 | Kayumi et al. | 296/66 |
| 6,003,926 | * | 12/1999 | Labeur | 296/37.8 |
| 6,073,984 | * | 6/2000 | Chaloult et al. | 296/37.13 |
| 6,196,605 | * | 3/2001 | Baldas et al. | 296/37.13 |

* cited by examiner

Primary Examiner—Stephen T. Gordon
Assistant Examiner—Paul Chenevert
(74) Attorney, Agent, or Firm—Ford Global Technologie Inc.

(57) ABSTRACT

A headrest storage structure 10 for securely and efficiently storing a headrest 16 of a vehicle seat 14 when the seat 14 is not in use. The structure includes a socket assembly 60 which is operatively disposed within a trim panel 18 of a vehicle 12 and which includes a pair of apertures 30, 32 which selectively receive headrest attachment members 34, 36, thereby securing the headrest to the vehicle trim 18.

9 Claims, 5 Drawing Sheets

REMOVABLE VEHICLE SEAT HEADREST STORAGE IN A TRIM PANEL SOCKET

BACKGROUND OF THE INVENTION

1. Field of the Invention

This invention relates to a headrest storage structure and more particularly, to a headrest storage structure which is integrated into the trim of a vehicle and which provides a location for the headrest of a vehicle seat to be securely stored when the seat is not in use.

2. Description of the Related Arts

Automotive vehicles often include seats which can be selectively stowed when not in use. For example and without limitation, one type of vehicle includes rear or auxiliary seats which may be selectively stowed within a tub or recess located beneath the seats. In this type of vehicle, the auxiliary seats are designed to fold downward into the tub or recess for efficient storage.

While this type of vehicle provides for efficient stowage of the auxiliary seats, it suffers from some drawbacks. For example and without limitation, in order for the seats to fit within the tub or recess, the headrests must be detached from the seats. These detached headrests are typically placed as loose items in a vehicle storage bin or within the rear of the vehicle. While the vehicle is being driven, the loose storage of these headrests creates an opportunity for noise, vibration, rattling, and cosmetic damage to the headrests or the vehicle's interior.

There is therefore a need for a headrest storage structure which provides a location for the headrest of a vehicle seat to be securely stored while the seat is not in use.

SUMMARY OF INVENTION

It is a first object of the present invention to provide a headrest storage structure which overcomes some or all of the previously delineated drawbacks of prior structures.

It is a second object of the present invention to provide a headrest storage structure which provides for the efficient and secure storage of a vehicle seat headrest while the vehicle seat is not in use.

It is a third object of the present invention to provide a headrest storage structure which is integrated into the trim of a vehicle.

It is a fourth object of the present invention to provide a headrest storage structure which substantially prevents rattling, loss and damage to the headrest.

According to a first aspect of the present invention, a headrest storage structure is provided for use with a vehicle having an amount of interior trim and a headrest having at least one attachment member. The structure includes a socket which is disposed within the interior trim and which is effective to selectively receive the attachment member, thereby allowing the headrest to be secured to the interior trim.

According to a second aspect of the present invention, a headrest storage assembly is provided for use with a vehicle of the type including a trim panel, a foldable seat, and a headrest which includes a pair of attachment members and which is selectively attached to the foldable seat. The headrest storage assembly includes a socket assembly which is operatively disposed within the trim panel and which includes a pair of apertures, the pair of apertures being effective to selectively receive the pair of attachment members, thereby allowing the headrest to be selectively attached to the trim panel when the foldable seat is not in use.

According to a third aspect of the present invention, a method is provided for storing a headrest which is selectively attachable to a vehicle seat. The method includes the steps of providing a socket for receiving an attachment portion of the headrest; operatively disposing the socket within a trim panel of the vehicle; and selectively inserting the attachment portion of the headrest into the socket, securing the headrest to the trim panel.

These and other features, aspects, and advantages of the present invention will become apparent by reading the following detailed description of the preferred embodiment of the invention and by reference to the following drawings.

DETAILED DESCRIPTION

Figure 1:
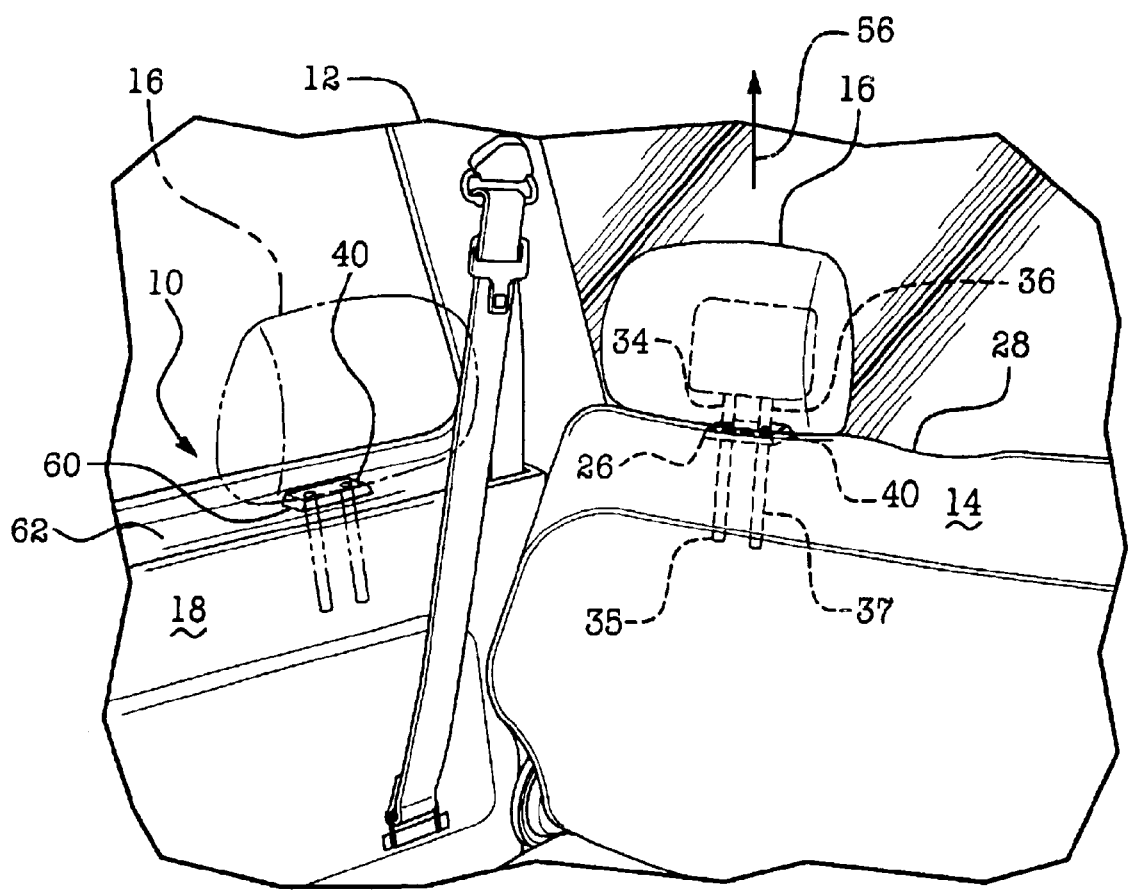
FIG. 1 is a perspective view of a headrest storage structure which is made in accordance with the teachings of a preferred embodiment of the present invention.
Figure 2:
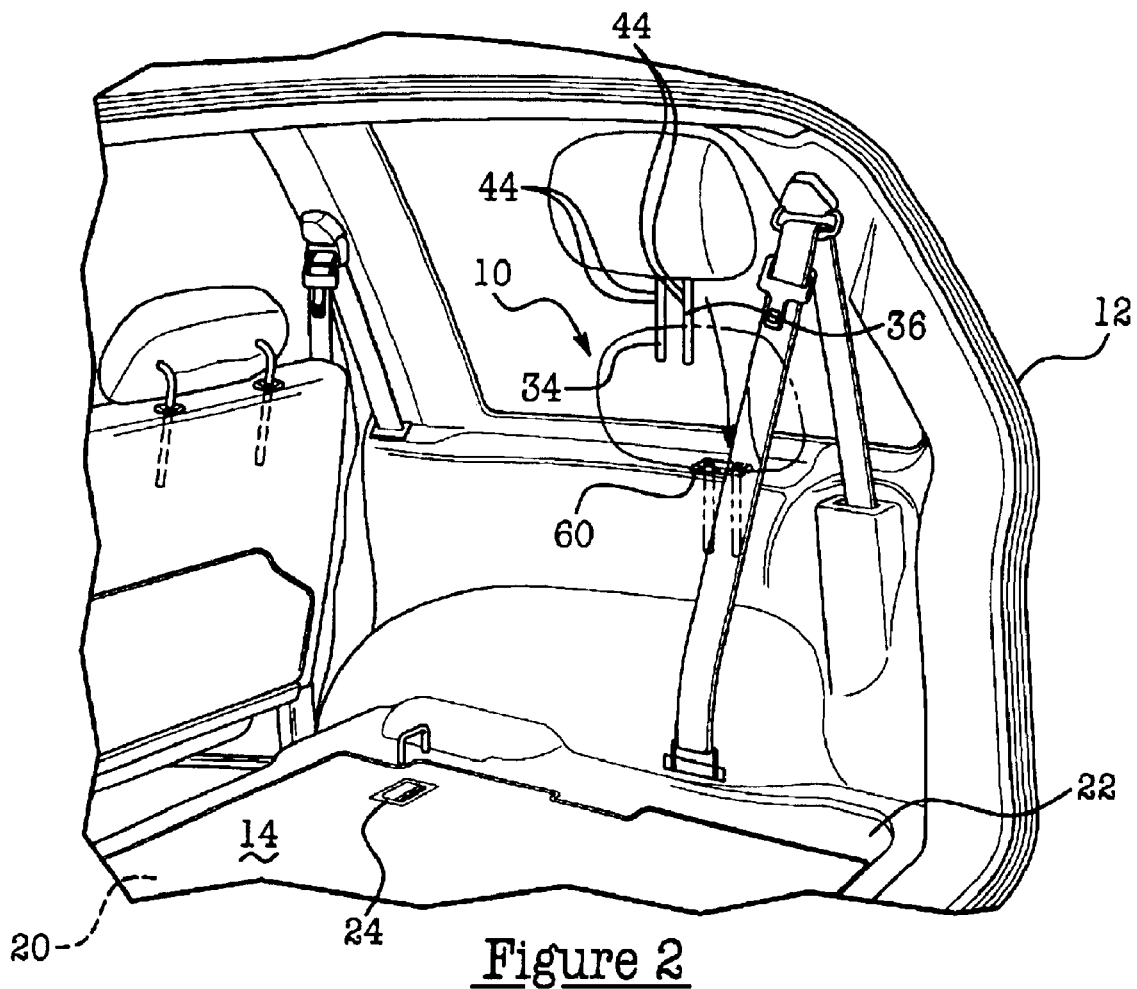
FIG. 2 is a perspective view of the storage structure shown in FIG. 1 illustrating the vehicle seat in a stowed position and a headrest stored within the storage structure.
Figure 3:
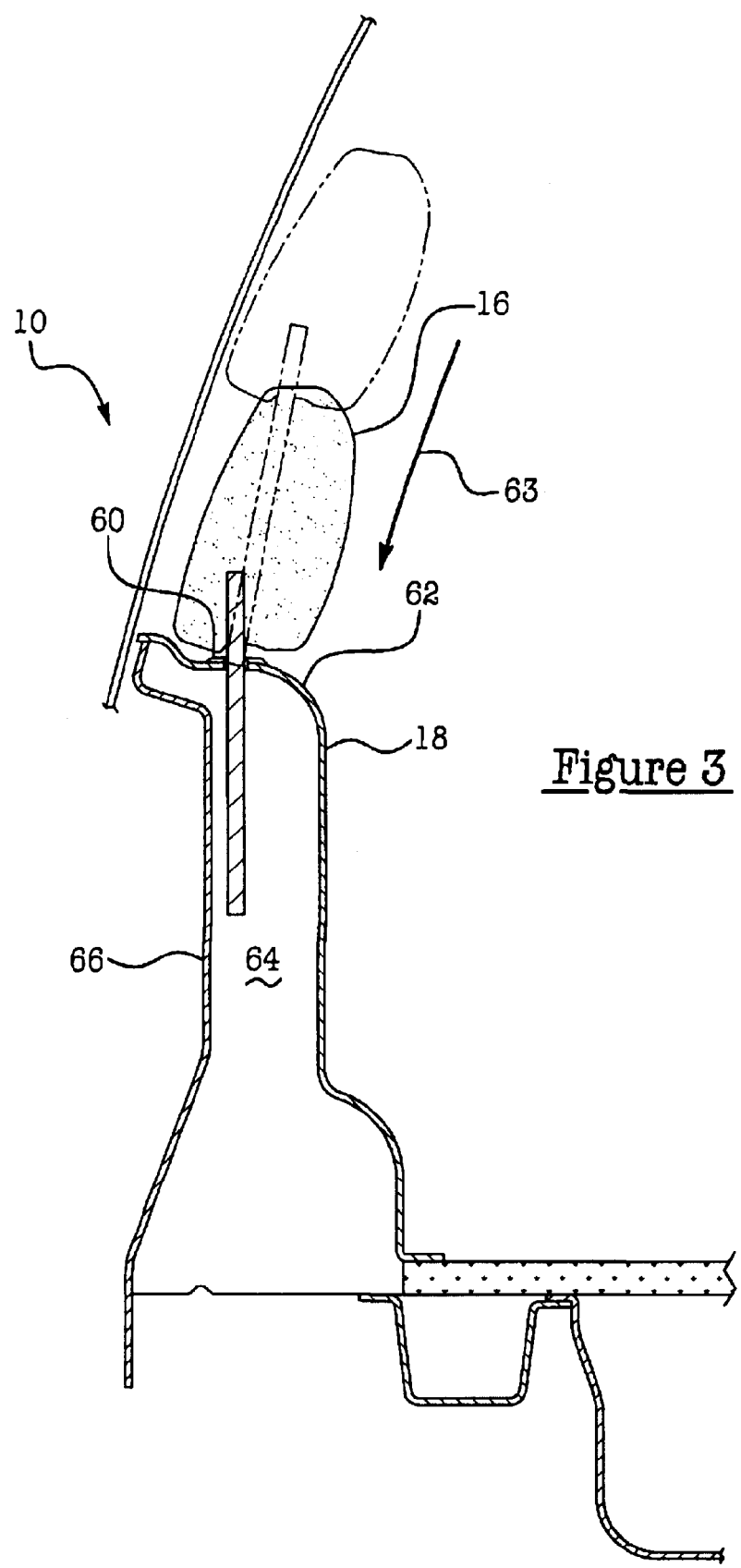
FIG. 3 is a side cut-away view of the storage structure shown in FIG. 1 and illustrating a headrest being inserted into the structure.

Referring now to FIGS. 1–3, there is shown a storage structure or apparatus 10 which is made in accordance with the teachings of the preferred embodiment of the invention and which is adapted for use with a vehicle 12 of the type including an auxiliary or rear seat 14, a headrest 16 which is removably mounted to seat 14, and interior vehicle trim 18. In the preferred embodiment of the invention, vehicle 12 is a van, minivan or sport-utility type vehicle. While the following discussion relates to the use of structure 10 with the headrest of an auxiliary or rear seat 14 of vehicle 12, it should be appreciated that structure 10 may be used in other applications or with other portions or types of vehicles.

In the preferred embodiment of the invention, auxiliary or rear seat 14 is of the type which is selectively foldable into a stowed position, which is shown in FIG. 2. Particularly, vehicle 12 includes a recess or tub 20 within the floor portion 22 of vehicle 12 which holds seat 14 when it is in a folded or stowed position. By actuating a handle 24 on seat 14, a user may selectively fold the seat 14 into its stowed position. As shown in FIG. 2, when the seat 14 is folded into the stowed position, the headrest 16 must first be removed from seat 14, so that the seat 14 may properly fit within recess 20.

Figure 4:
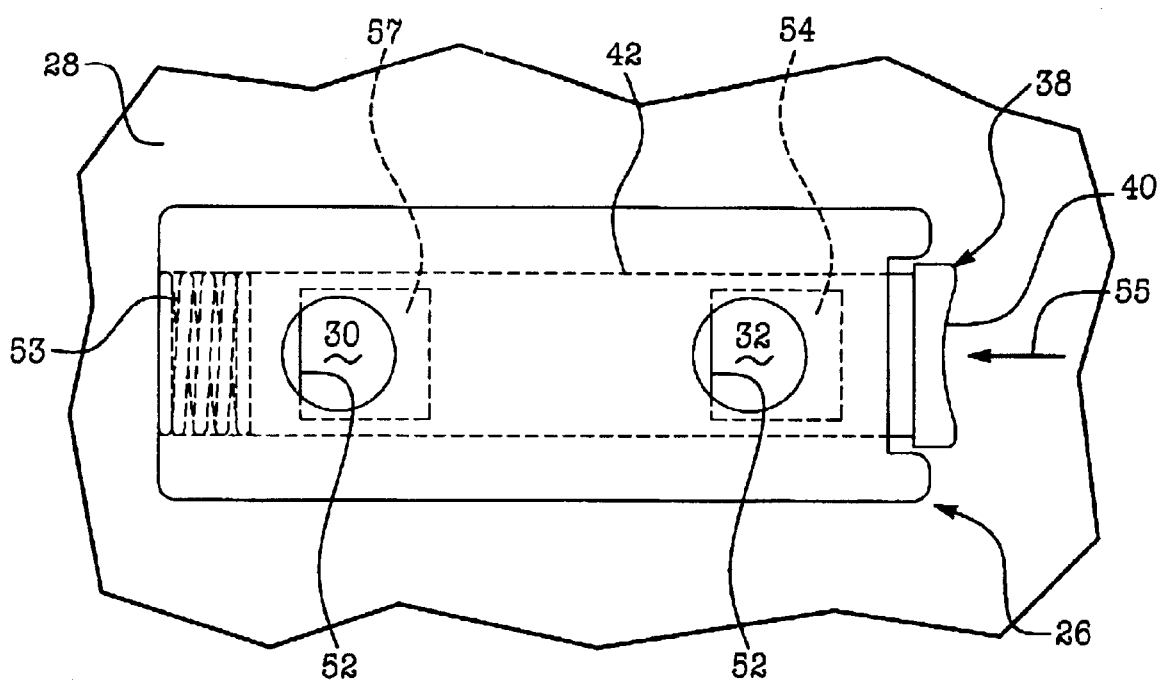
FIG. 4 is a top view of a socket assembly which is used in the preferred embodiment of the present invention.

Seat 14 further includes a socket assembly 26 which, as shown best in FIG. 4, is operatively disposed within the top surface 28 of seat 14. Socket assembly 26 is generally rectangular in shape and includes a pair of apertures 30, 32 which selectively receive attachment members or prongs 34, 36 of headrest 16. The apertures 30, 32 are aligned with and/or correspond to cavities 35, 37 which are formed within seat 14 and which receive prongs 34, 36 when headrest 16 is attached to seat 14. In the preferred embodiment, socket assembly 26 further includes a spring-loaded locking mechanism 38. Mechanism 38 includes a button portion 40, a locking member 42, and a spring 53 which biases mechanism 38 in a locked position or state. Locking member 42 is effective to selectively engage notches 44 that are integrally formed within prongs 34, 36, thereby securing headrest 16 onto seat 14. Particularly, edges 52 of locking member 42 engage notches 44 when mechanism 38 is in a locked position or state. When button 40 is depressed in the direction of arrow 55, spring 53 is compressed and generally square apertures 54, 57 within locking member 42 are aligned with apertures 30, 32, thereby allowing prongs 34, 36 to be removed from apertures 30, 32. It should be appreciated that the foregoing locking mechanism 38 is described for illustrative purposes only and in other alternate embodiments, various other types of locking mechanisms may be used within socket assembly 26.

Figure 5:
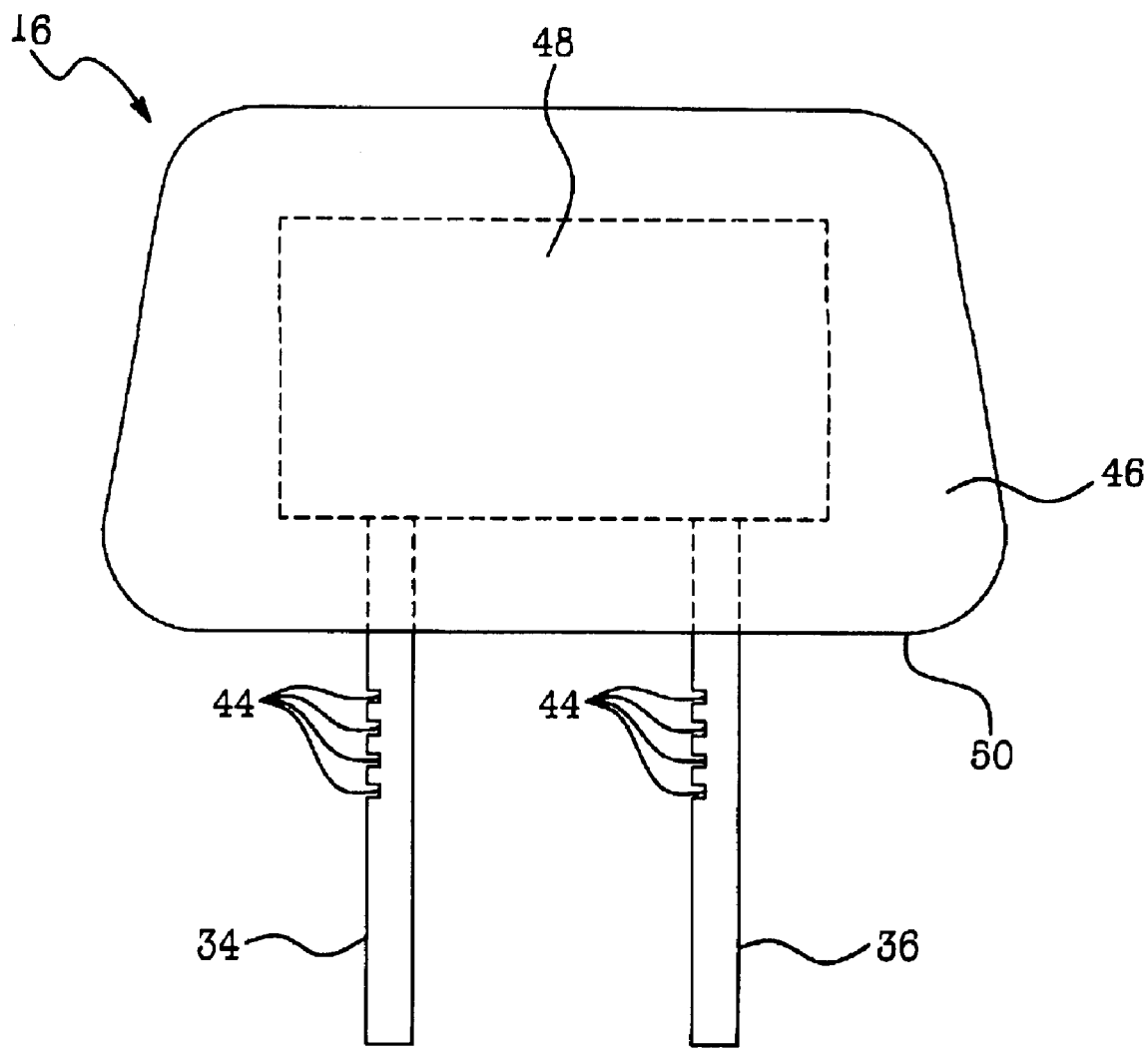
FIG. 5 is a front view of a headrest which is used in combination with the storage assembly shown in FIG. 1.

As shown best in FIG. 5, headrest 16 includes a foam cushion 46, an inner member 48 which is disposed within cushion 46, and prongs 34, 36 which are coupled to member 48 and which orthogonally project from the bottom surface 50 of cushion 46. In the preferred embodiment of the invention, attachment members 34, 36 are made from a relatively strong and durable material such as steel. Members 34, 36 each include several integrally formed notches 44 which cooperatively allow headrest 16 to be positioned at various heights relatively to top surface 28 of seat. 14. Particularly, locking mechanism 42 can engage various pairs of notches 44, thereby securing headrest 16 at various positions or heights relative to surface 50. In other alternate embodiments, prongs 34, 36 may be replaced with a single prong or attachment member or a different number of prongs or attachment members. In such embodiments, socket assemblies 26 and 60 will have a corresponding number of reception apertures.

In the preferred embodiment of the invention, structure 10 includes a socket assembly 60, which is substantially identical in structure and function to socket assembly 26, and which is operatively disposed within vehicle trim 18. In the preferred embodiment of the invention, trim 18 comprises the rear quarter trim panel of vehicle 12. Particularly, socket assembly 60 is disposed within a generally horizontal upper surface 62 of trim panel 18. In one non-limiting embodiment, socket assembly 60 is secured in a conventional manner within an aperture which is formed within surface 62 and which conforms to the shape of socket assembly 60. As shown best in FIG. 3, trim panel 18 forms a hollow channel or cavity 64 between panel 18 and the vehicle body 66. When headrest 16 is disposed within socket assembly 60, prongs or attachment members 34, 36 reside within cavity 64 between trim 18 and vehicle body 66, as shown best in FIG. 3. While in the preferred embodiment socket assembly 60 is substantially identical to socket assembly 26, it should be appreciated that in other alternate embodiments, socket assembly 60 may be of various other shapes and sizes suitable to receive and secure attachment members 34, 36.

In operation, when a user desires to fold or stow away seat 14, the user first removes headrest 16 by depressing button 40, thereby disengaging locking mechanism 38, and lifting upwards in the direction of arrow 56 (see FIG. 1). Once the headrest 16 is removed, seat 14 can be folded into its stowed position within recess or tub 20. Headrest 16 is then inserted into socket assembly 60. Particularly, attachment members 34, 36 are aligned with apertures 30, 32, button 40 is depressed, and headrest 14 is moved downward in the direction of arrow 63 (see FIG. 3). Once inserted into socket assembly 60, locking mechanism 38 engages attachment members 34, 36 (e.g., button 40 is released and edges 52 engage a pair of notches 44), thereby securing headrest 16 within structure 10. In this manner, structure 10 provides for the efficient and secure storage of headrest 16 when vehicle seat 14 is not in use.

It is to be understood that the invention is not limited to the exact construction or method which has been previously delineated above, but that various changes and modifications may be made without departing from the spirit and the scope of the following claims.

What is claimed is:

1. A headrest storage structure for use with a vehicle of the type including an amount of interior trim and a headrest having a pair of attachment members, said structure comprising a pair of apertures which are disposed within said interior trim and which are effective to selectively receive said pair of attachment members, thereby allowing said headrest to be secured to said interior trim.

2. The headrest storage structure of claim 1 wherein said structure further comprises a locking mechanism which is adapted to selectively engage said pair of attachment members, thereby securing said headrest to said interior trim.

3. A headrest storage assembly for use with a vehicle of the type including a trim panel, a foldable seat, and a headrest which includes a pair of attachment members and which is selectively attached to said foldable seat, said headrest storage assembly comprising:

a socket assembly which is operatively disposed within said trim panel and which includes a pair of apertures, said pair of apertures being effective to selectively receive said pair of attachment members, thereby allowing said headrest to be selectively attached to said trim panel when said foldable seat is not in use.

4. The headrest storage assembly of claim 3 wherein said socket assembly includes a spring-loaded locking mechanism which is adapted to selectively engage and disengage at least one of said pair of attachment members when said headrest is attached to said trim panel.

5. The headrest storage assembly of claim 4 wherein said spring-loaded locking mechanism includes a button member for selectively actuating said mechanism.

6. The headrest storage assembly of claim 3 wherein said trim panel comprises a rear quarter trim panel.

7. The headrest storage assembly of claim 6 wherein said vehicle comprises a van.

8. The headrest storage assembly of claim 6 wherein said vehicle comprises a minivan.

9. The headrest storage assembly of claim 6 wherein said vehicle comprises a sport-utility vehicle.

* * * * *